Figure 1:
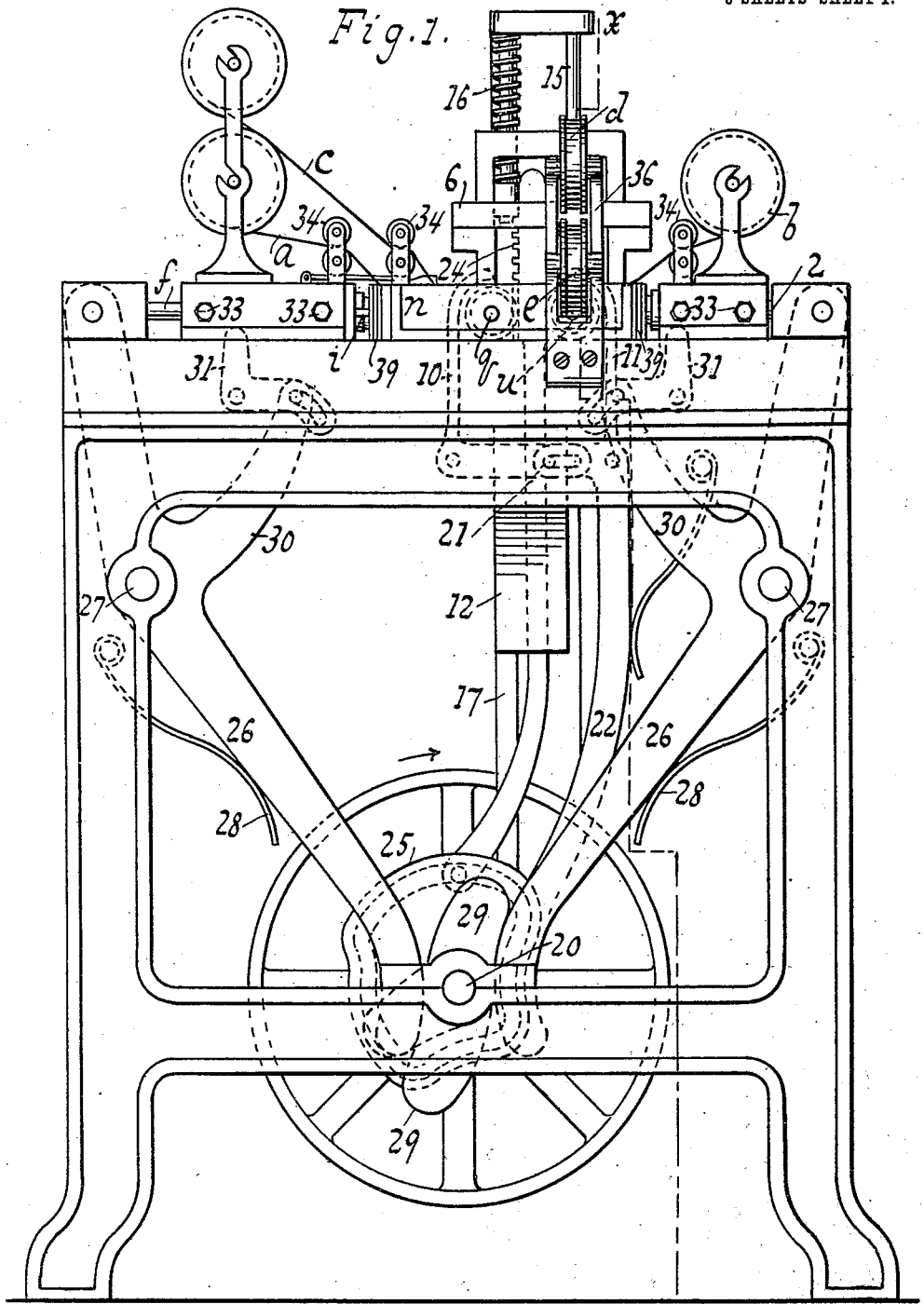

L. BLUMENTHAL.
MACHINE FOR AUTOMATICALLY MANUFACTURING SECTIONAL BUTTONS.
APPLICATION FILED DEC. 28, 1909.

992,540.

Patented May 16, 1911.

6 SHEETS—SHEET 1.

Witnesses:
William Miller
Christian Almstaedt

Inventor
Louis Blumenthal
By his Attorneys
Hauff & Warland

L. BLUMENTHAL.
MACHINE FOR AUTOMATICALLY MANUFACTURING SECTIONAL BUTTONS.
APPLICATION FILED DEC. 28, 1909.

992,540.

Patented May 16, 1911.

Witnesses:
William Miller
Christian Almstaedt

Inventor
Louis Blumenthal
By his Attorneys
Hauff & Warland

L. BLUMENTHAL.
MACHINE FOR AUTOMATICALLY MANUFACTURING SECTIONAL BUTTONS.
APPLICATION FILED DEC. 28, 1909.

992,540.

Patented May 16, 1911.

6 SHEETS—SHEET 5.

Witnesses:
William Miller
Christian Almstaedt

Inventor
Louis Blumenthal
By his Attorneys
Hauff - Warland

L. BLUMENTHAL.
MACHINE FOR AUTOMATICALLY MANUFACTURING SECTIONAL BUTTONS.
APPLICATION FILED DEC. 28, 1909.
992,540.
Patented May 16, 1911.
6 SHEETS—SHEET 6.
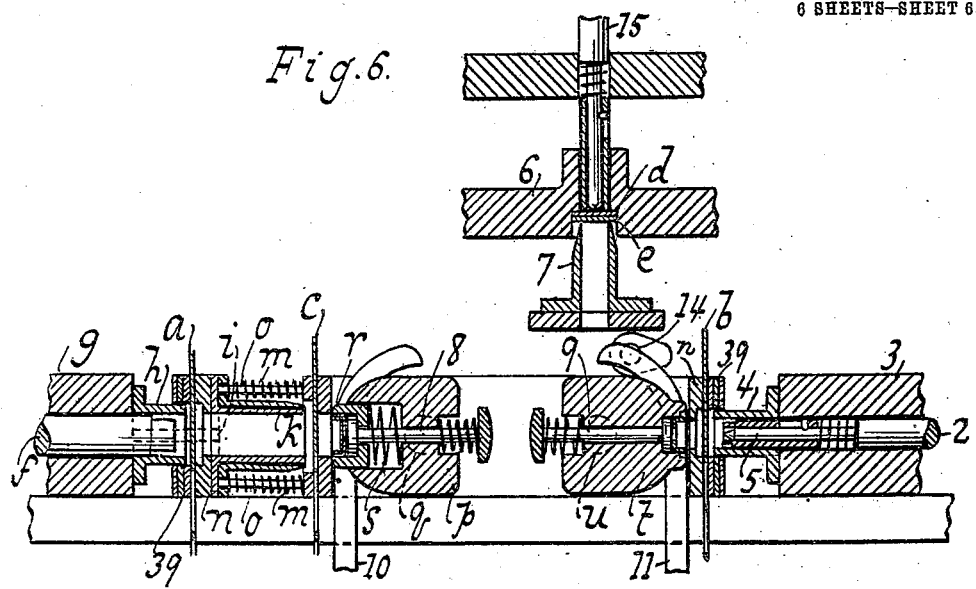
Witnesses:
William Miller
Christian Almstaedt
Inventor
Louis Blumenthal
By his Attorneys
Hauff & Warland

UNITED STATES PATENT OFFICE.

LOUIS BLUMENTHAL, OF BROOKLYN, NEW YORK.

MACHINE FOR AUTOMATICALLY MANUFACTURING SECTIONAL BUTTONS.

992,540. Specification of Letters Patent. Patented May 16, 1911.

Application filed December 28, 1909. Serial No. 535,258.

*To all whom it may concern:*

Be it known that I, LOUIS BLUMENTHAL, a citizen of the United States, residing at Brooklyn, in the county of Kings and State of New York, have invented new and useful Improvements in Machines for Automatically Manufacturing Sectional Buttons, of which the following is a specification.

According to the method usually employed in the manufacture of sectional buttons, whether covered or uncovered, each and every part is punched in a separate press. A separate press is then required to assemble the parts. I have produced a machine wherein the separate presses are combined in a single machine and which is so constructed as to work automatically. The strips of metal from which the metal parts of the buttons are to be cut and the strips of material to cover the faces of the buttons are automatically fed to the machine, the parts of the button are automatically cut out and assembled, and complete buttons are produced and thrown out through a chute at each revolution of the machine.

This invention relates to a machine or apparatus for the manufacture of buttons which buttons are of sectional construction or composed of several parts. The buttons can be of plain metal or covered with any suitable material.

The machine comprises a combination of several punches and plungers and slides supporting the same. These parts are suitably installed to work in harmony with one another.

The machine also comprises assembling dies which are arranged to rotate or swivel as presently explained. These dies provide means for combining the upper and lower parts of the button. The device can also be provided with means for continuously moistening the plunger and punches with oil to ease the friction of the same.

This invention is set forth in the following specification and claims and illustrated in the accompanying drawing in which:—

Figure 2:
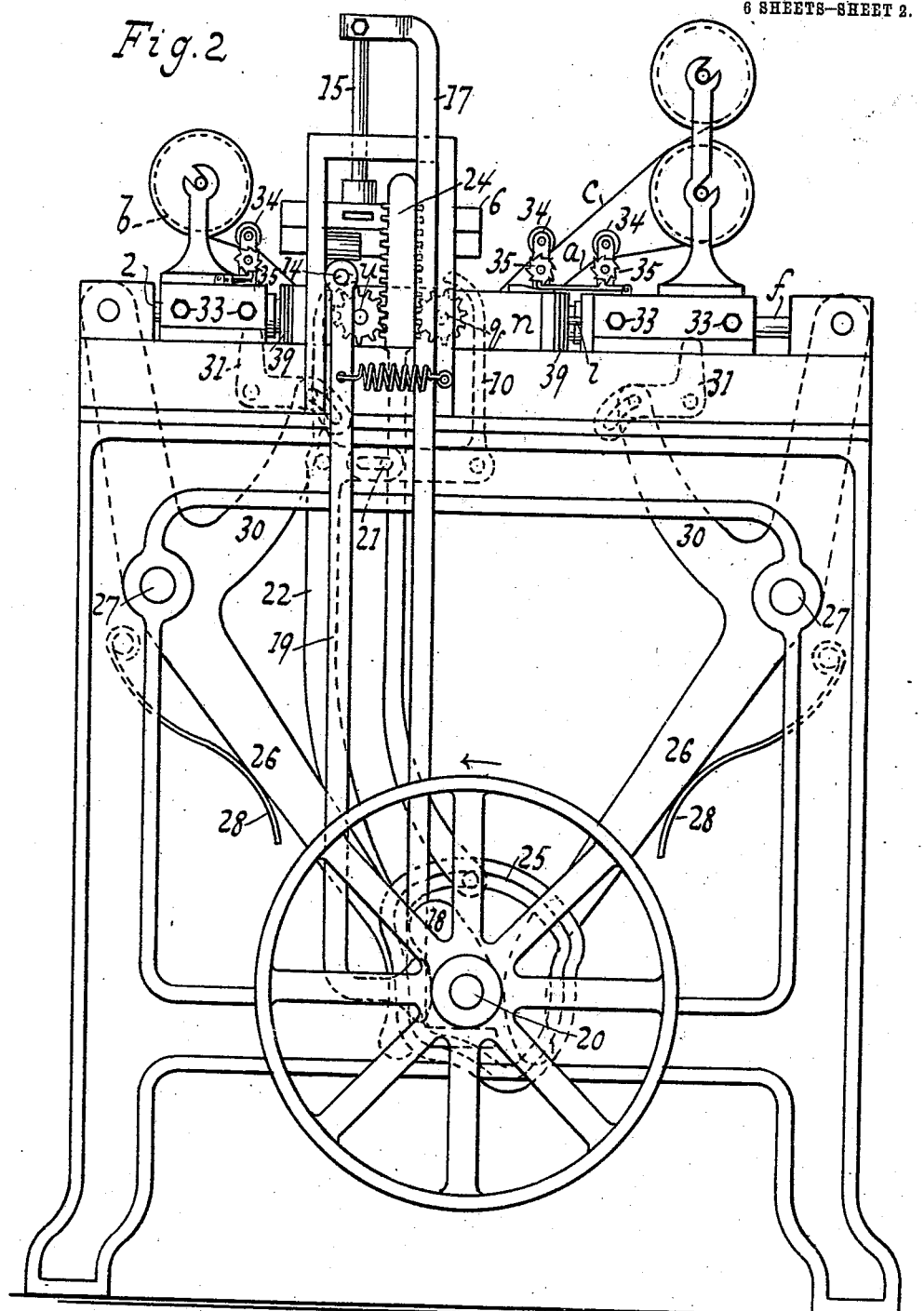
Figure 3:
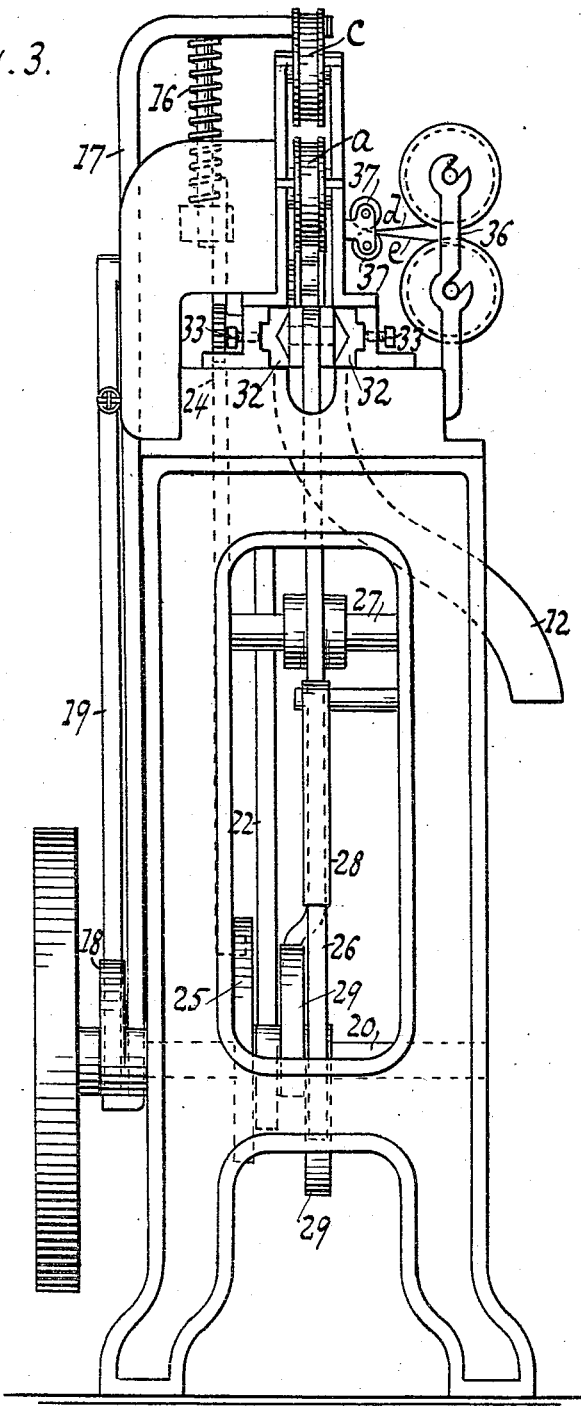
Figure 4:
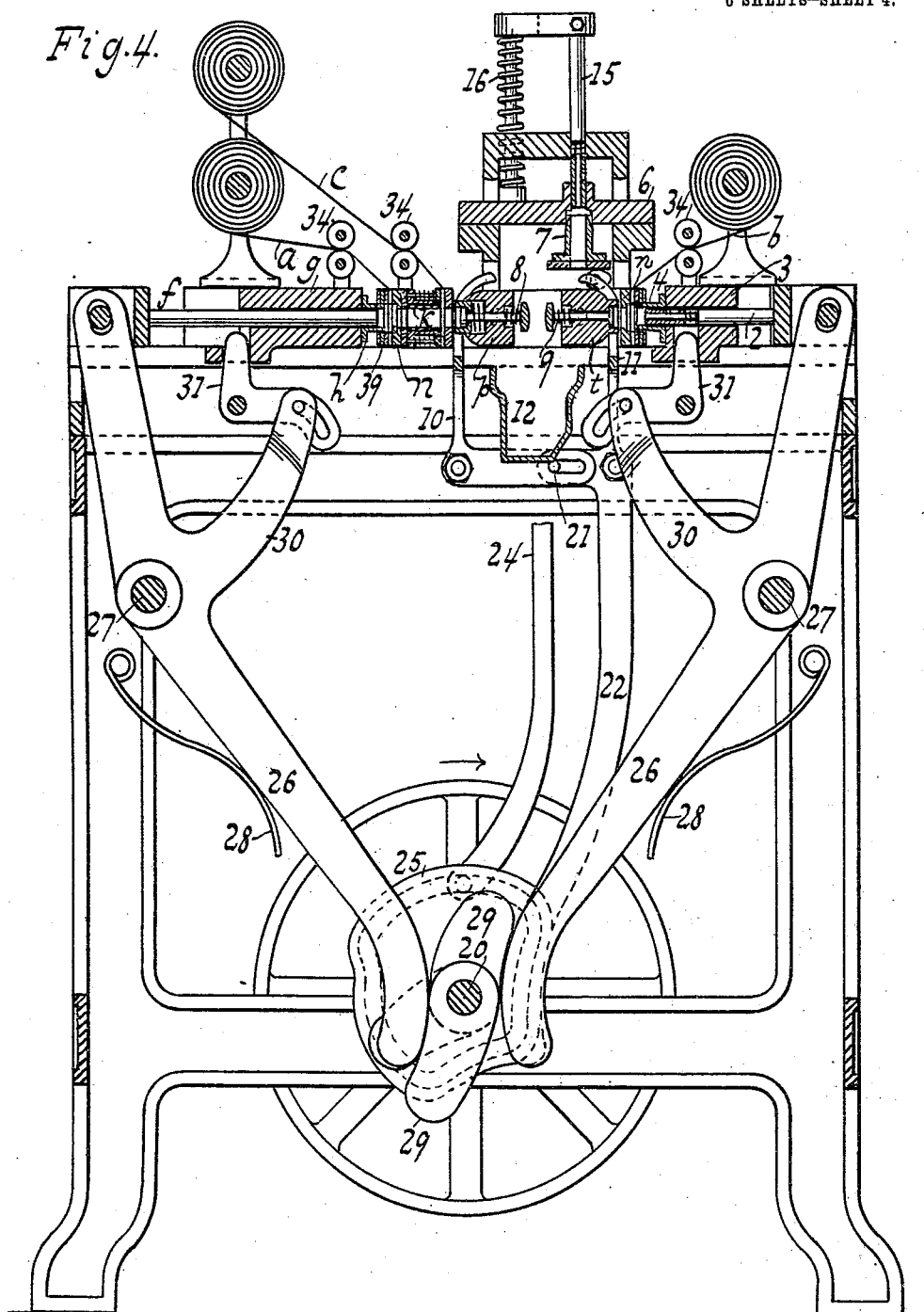
Figure 5:
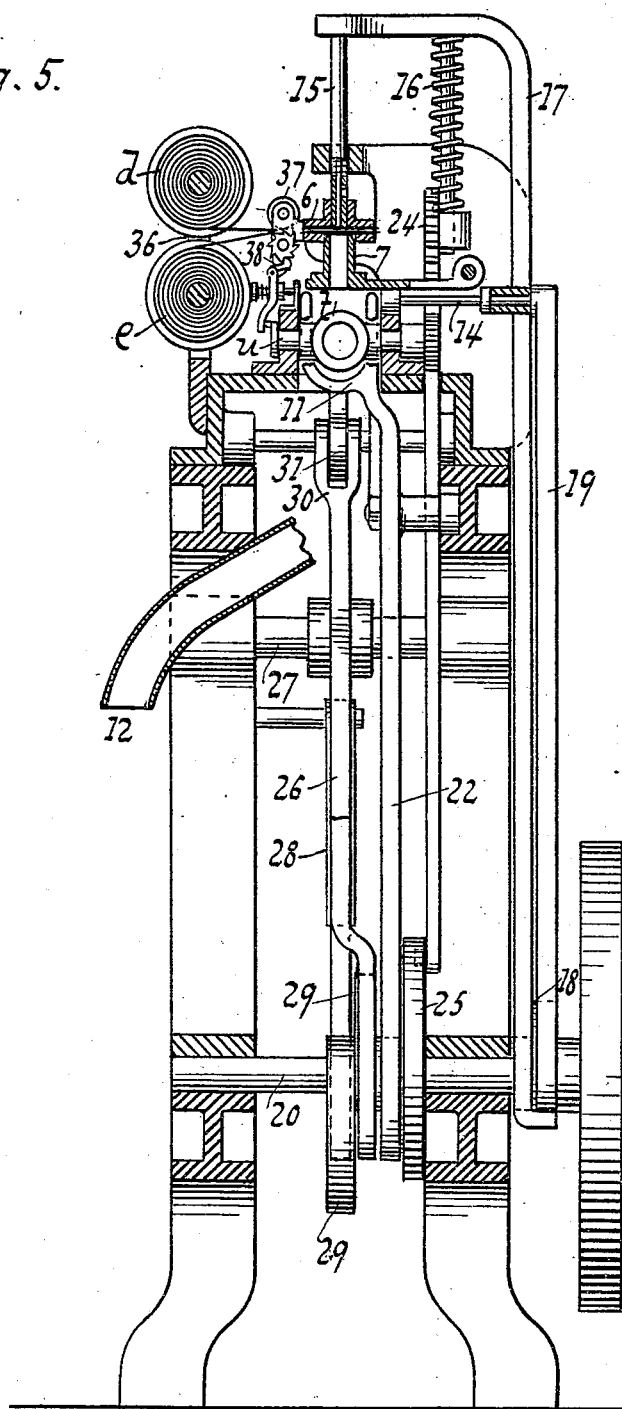

Figure 1 shows a front elevation of a machine embodying this invention. Fig. 2 is a rear elevation of Fig. 1. Fig. 3 is an end elevation of Fig. 1. Fig. 4 is a sectional side elevation looking at the front of the machine the section being taken vertically through the center of the machine. Fig. 5 is a section along the line $x$ $x$ Fig. 1. Fig. 6 is a side elevation of pressure rods with sectional view of slides containing the same and adjacent parts. Fig. 7 is a view like Fig. 6 showing the assembling dies as having been given a quarter turn from the position indicated in Fig. 6. Fig. 8 shows the assembling dies as having been given a half turn to assemble the opposite parts or sections composing the button. Fig. 9 shows the assembling dies as having been given an additional quarter turn to discharge the finished button from one of the dies. Fig. 10 is a sectional view of a finished button.

In this drawing the button illustrated in Fig. 10 as shown is composed of a metallic top-plate $a$ suitably dished and into which is pressed a suitable base-plate or disk $b$ also dished. A cloth facing $c$ can be placed upon the top-plate $a$ and the edge of this disk or cloth $c$ can be clamped between this metallic disk $a$ and the lower disk or plate $b$. Between the plates $a$, $b$ is contained a suitable disk $d$ of suitable filling material such as pasteboard or the like below which is confined or clamped a disk or strip $e$ of buckram or suitable material suitably elevated or humped to form a shank for attaching the thread to sew the button in place. This filling material prevents the shank material from being pulled out of place.

A reciprocating plunger is shown at $f$ working through a slide $g$. Secured to the slide and seated about the plunger $f$ is a punch $h$. This slide $g$ also carries stems $i$ which engage a punch $k$. When the slide $g$ is moved forward the punch $h$ cuts a disk from the metal strip $a$, while the punch $k$ cuts a disk from the strip $c$. As the plunger $f$ is moved forward said plunger carries the metal disk from strip $a$ with the cloth disk cut from strip $c$ toward one of the assembling dies $p$. The punch $k$ when moved forward compresses springs $m$ which are coiled about stems $o$. These stems $o$ extend from a plate or guide piece $n$ which serves to guide the metal strip into the machine.

The assembling die $p$ is adapted to swivel or turn about a suitable stem or support $q$ and this die carries a cup like former or shaper $r$ which is suitably pressed or held forward in the die by a spring $s$. When the plunger $f$ moves the metal $a$ with cloth $c$ forward through the guide piece $n$ into the former $r$ the metal is dished and the cloth or material $c$ is lapped over the metal for the two to be seated in the former $r$. Opposite the first named die is another die *t* also mounted to swivel on a support *u*. Another plunger 2 is mounted to reciprocate through a slide 3 carrying a punch 4 which punch is adapted to cut a disk from a strip of metal from which is cut plate or disk *b*. This plunger 2 carries a perforator or prong 5 for perforating the disk *b* to allow the projection of the buckram shank *e* above referred to. When the metal disk *b* has been rimmed or given a dish shape by its insertion or being forced through the guide piece *n'* the disk *b* is inserted into the die *t* see Fig. 6 and the dies are given a quarter turn to bring them to the position indicated in Fig. 7. In this position the die *t* presents the metal disk *b* to the tubular punch 7. The card-board *d* and buckram *e* being cut into circular shape by having forced thereagainst the punch 7 said card-board and buckram disks are forced through this tubular punch 7 into the metallic disk *b* in the die *t*. The dies *p*, *t* are then given a quarter turn to bring them to the position indicated in Fig. 8. In this position the dies *p*, *t* present the disk sections *a*, *b* to one another and the formers containing these disk sections are pressed together by their plungers 8, 9 being pressed by levers 10 and 11. The assembling dies *p*, *t* are then given another quarter turn to the position indicated in Fig. 9. The free ends of the levers 10 and 11 are somewhat curved as shown in Figs. 8 and 9 and when the dies are turned to the position shown in Fig. 9 these free ends of the levers will press and hold plungers 8 and 9 somewhat out of the dies so that the completed button will fall out of the dies and be delivered through chute 12. Whether the button should adhere to one die or another, would in such case make no difference as to the delivery of the button into the chute 12.

A guide for the card-board or filling material *d* and for the shank material *e* is formed in a bracket or fixed arm 6. Against this bracket 6 acts the tubular cutter 7 which is oscillated at suitable moments by a nose on the rock shaft 14. The plunger 15 moves transversely to the direction of motion of the plungers *f* and 2. This plunger 15 forces the card-board disk and shank material through the cutter 7 to the assembling die. The plunger 15 is held or elevated by a spring 16 and is depressed at suitable moments by the arm 17 actuated by a nose or cam piece 18. The rock shaft 14 is oscillated at suitable moments by its depending arm 19 being engaged by said nose or cam 18 which is mounted on the shaft 20.

The levers 10 and 11 which compress the plungers in the assembling dies toward one another are each in form of a bell crank lever and are linked together or caused to move in unison by means of a pin and slot connection. The pin connection is indicated at 21. The actuating arm for these bell crank levers is shown at 22 and extends into contact with a cam or nose on the rotary shaft 20.

The rotation or oscillation of the assembling dies is effected by a rack 24 engaging gear wheels mounted on the shafts or supports *q*, *u* on the assembling dies. This double faced rack 24 is engaged and reciprocated by a suitably shaped or grooved cam 25 Fig. 2 mounted on the rotary shaft 20.

The plungers *f* and 2 are pressed toward one another by means of levers 26 which are each of the same construction. Each lever 26 has its fulcrum 27 fixed in the frame of the machine and is moved in one direction or the plunger retracted by springs 28. The levers 26 are actuated to move the plungers toward one another by means of a cam 29 comprising two wings and mounted on the shaft 20. Each of the levers 26 has an arm 30 which by means of a pin and slot connection engages the bell crank lever 31. These bell crank levers 31 engage the slides *g* and 3 respectively so as to move the slides at the proper time when the plungers are moved. The slides *g* and 3 are actuated between blocks 32 which can be set to and from one another as required by means of set screws 33. On the stationary blocks 32 are mounted spindles for supplying the strips *a* and *c*. These strips are unrolled and fed into the machine by rollers 34 which are actuated at suitable moments by ratchets and pawls 35 (Fig. 2) pivoted to the slides *g* and 3.

The covering material or cloth *c* can be omitted if it is desired to leave the face-plate *a* exposed. The filling material *d* and shank material *e* can be supplied from rolls suitably supported as on a standard as indicated at 36 Fig. 5. The strips *d* can be fed between rollers 37 suitably actuated by means of a ratchet and pawl as indicated at 38. The pawl can be suitably actuated by a projection or tappet projecting from the support or swivel *u*.

Oil for lubrication of the cutters or punches can be supplied by suitable means as by a ring of absorbent material indicated at 39 which can be supplied or moistened with oil in suitable manner.

The strips *a b* and *c* are led from the reels and guided between rollers 34. Each of the lower pairs of these rollers is provided with a ratchet wheel 35. Suitable pawls pivoted to the slides *g* and 3 (see Fig. 2) engage these ratchet wheels at each movement of the slides to intermittently rotate them. The strips *d* and *e* are guided between rollers 37, the lower roller having a ratchet wheel adapted to be engaged by a pawl 38 pivoted to a spring pressed sliding bracket, which, when engaged by the projection on a disk fastened to the journal *u*, slides the bracket against the spring to tension it and give intermittent motion to the ratchet as seen in Fig. 5.

It will be seen that when the journal $u$ is oscillated it swings the projection on the disk out of contact with the bracket and the action of the spring slides the bracket toward the journal. The pawl then moves into engagement with one of the teeth on the ratchet.

From the foregoing description it will be understood that the feed rollers feed predetermined lengths of strips to the guides and only after the metal has been punched, the cloth, cardboard and buckram cut and pushed into the dies, and the plungers retracted. The plungers $f$ and 2 are caused to move toward the die by levers 26 and both plungers come into contact with the metal strips $a$ and $b$ which in the interval had been punched by the tools $h$ and 4. At the same time the puncturing tool 5 has perforated the disk $b$. These disks are of the same diameter as the guides $n$ and $n'$ and are then pushed by the plungers toward the dies until they impinge on the shoulders in the said guides where they are rimmed. The punches then remain stationary while the plungers push the rimmed disks farther toward the dies. The plunger $f$, when moving toward its die, slides in a bushing fixed to the guide $i$, said bushing being practically of the same diameter as the plunger. The knife $k$, which is adapted to slide on the bushing, has in the meanwhile been actuated to cut from the strip $c$ a circular piece of cloth of larger diameter than the rimmed disk. The plunger then pushes the disk and the cloth facing until they arrive at the second shoulder adjacent to the knife where the cloth is shaped and lapped about the rimmed portion of the disk and both are pushed into the die $p$ (see Fig. 6). The dies are then oscillated to the position shown in Fig. 7. The strips of cardboard $d$ and buckram $e$ are then cut by actuating the knife 7 and the plunger 15 then slides downward, pushing and at the same time shaping a protuberance into the cardboard and the buckram and forcing them into the rimmed perforated disk $b$ in the die $t$. The dies then oscillate to the position shown in Fig. 8 and the rods 8 and 9 are then actuated by means of levers 10 and 11 to push them toward one another and press the cloth faced disk $a$ and the perforated disk $b$ with its filling or stiffener of cardboard and buckram toward one another, thus uniting the sections together. The dies then oscillate but before they assume the position shown in Fig. 9 the finished button has been forced out of the dies and gravitated into the chute.

The finished button comprises a disk $a$ provided with a rim, the face of which has a cloth cover $c$ looped about the rim forming the front portion of the button. The rimmed disk $b$ forms the back of the button, the buckram $e$ and the cardboard $d$ are located between the respective disks $a$ and $b$ and the buckram is provided with a protuberance which extends out of the perforated part of the disk, whereby the button can be sewed to a garment.

I claim:—

1. In a device of the kind described a pair of plungers with assembling dies, guides for strips of material adjacent to the plungers to be passed thereby into the dies, supports to allow swinging of the assembling dies and a chute to receive the article discharged from the dies.

2. In a device of the kind described a pair of plungers with assembling dies, guides for strips of material adjacent to the plungers to be passed thereby into the dies, circular cutters adjacent to the dies to cut blanks from the strips, supports to allow swinging of the dies, and a chute to receive articles discharged from the dies.

3. In a device of the kind described a pair of plungers with assembling dies, guides for strips of material adjacent to the plungers to be passed thereby into the dies, supports to allow swinging of the assembling dies a chute to receive the article discharged from the dies, and a plunger placed at an angle to the first mentioned plungers and combined with a tubular cutter adapted to cut and apply filling material, said last mentioned plunger being adapted to insert the filling and shank material into an assembling die section when in position under the last mentioned plunger.

4. A device of the kind described comprising a pair of plungers and slides, cutters actuated by the slides, oscillatory dies for receiving and shaping material fed by the plungers, a transversely placed plunger with tubular cutter in line with one of the dies, a plunger in each of the dies and levers for actuating the plungers in the dies to compress the material between the dies and to eject the article from the dies.

5. In a device of the kind described a pair of plungers with assembling dies, guides for strips of material adjacent to the plungers to be passed thereby into the dies, supports to allow swinging of the assembling dies and a chute to receive the article discharged from the dies, gears and a rack for oscillating the dies and a cam for actuating the rack.

6. In a device of the kind described the combination with plungers and dies, means for pivoting the dies, slides for guiding the plungers, cutters actuated by the slides, feeding rollers to lead material to the cutters and ratchets with pawls actuated by the slides to rotate the feeding rollers.

7. In a device of the kind described the combination with plungers and dies, means for swiveling the dies, slides for guiding the plungers, cutters actuated by the slides, feeding rollers to lead material to the cutters, ratchets with pawls actuated by the slides to rotate the feeding rollers, a plunger placed transversely to the first mentioned plungers, a tubular cutter placed in line with the angularly placed plunger, a feeding roller to lead material to the angularly placed plunger and a ratchet and pawl engaged by one of the swiveling dies to feed material to the angularly placed plunger.

8. In a device of the kind described the combination with plungers and dies, means for swiveling the dies, slides for guiding the plungers, cutters actuated by the slides, lubricating rings in the paths of the cutters, feeding rollers to lead material to the cutters, ratchets with pawls actuated by the slides to rotate the feeding rollers, a plunger placed transversely to the first mentioned plungers, a tubular cutter placed in line with the angularly placed plunger, a feeding roller to lead material to the angularly placed plunger and a ratchet and pawl engaged by one of the swiveling dies to feed material to the angularly placed plunger.

In testimony whereof I have hereunto set my hand in the presence of two subscribing witnesses.

LOUIS BLUMENTHAL.

Witnesses:
  W. C. HAUFF,
  CHRISTIAN ALMSTAEDT.

---

Copies of this patent may be obtained for five cents each, by addressing the "Commissioner of Patents, Washington, D. C."